(12) United States Patent
Johnsson et al.

(10) Patent No.: US 10,265,730 B2
(45) Date of Patent: Apr. 23, 2019

(54) VIBRATORY DEVICE FOR COMPACTING MACHINE

(71) Applicant: Dynapac Compaction Equipment AB, Karlskrona (SE)

(72) Inventors: Niklas Johnsson, Nättraby (SE); Christian Karlsson, Karlshamn (SE)

(73) Assignee: DYNAPAC COMPACTION EQUIPMENT AB (SE)

( * ) Notice: Subject to any disclaimer, the term of this patent is extended or adjusted under 35 U.S.C. 154(b) by 0 days.

(21) Appl. No.: 15/548,810

(22) PCT Filed: Feb. 19, 2016

(86) PCT No.: PCT/IB2016/000153
§ 371 (c)(1),
(2) Date: Aug. 4, 2017

(87) PCT Pub. No.: WO2016/125007
PCT Pub. Date: Aug. 11, 2016

(65) Prior Publication Data
US 2018/0236490 A1 Aug. 23, 2018

(51) Int. Cl.
*E01C 19/00* (2006.01)
*B06B 1/16* (2006.01)
*E01C 19/28* (2006.01)
*E02D 3/074* (2006.01)
*F16C 3/18* (2006.01)

(52) U.S. Cl.
CPC .............. *B06B 1/162* (2013.01); *B06B 1/161* (2013.01); *E01C 19/286* (2013.01); *E02D 3/074* (2013.01); *F16C 3/18* (2013.01)

(58) Field of Classification Search
CPC ... E02D 3/074; E01C 3/18; F16C 3/18; B06B 1/162
USPC .................................................. 404/113, 117
See application file for complete search history.

(56) References Cited

U.S. PATENT DOCUMENTS

| | | |
|---|---|---|
| 2,480,825 A | 9/1949 | Adolph |
| 4,084,445 A | 4/1978 | Erwin |
| 4,262,549 A * | 4/1981 | Schwellenbach ....... B06B 1/166 209/367 |
| 4,472,980 A * | 9/1984 | Wadensten .......... B01F 11/0002 366/126 |

(Continued)

FOREIGN PATENT DOCUMENTS

| | | |
|---|---|---|
| CN | 201217772 Y | 4/2009 |
| EP | 3156543 A1 | 4/2017 |
| JP | 2000 301066 A | 10/2000 |

*Primary Examiner* — Raymond W Addie
(74) *Attorney, Agent, or Firm* — Condo Roccia Koptiw LLP

(57) ABSTRACT

Vibratory device (1) for compacting machine comprising a shaft (3), at least one eccentric mass (4,5,6) rotatable arranged around the shaft (3) and at least one motor (8) arranged around the shaft (3). The motor (8) is arranged for rotating drive of at least one of the eccentric masses (4,5,6) around the shaft (3). The motor (8) comprise a winding unit (9) connected to, the shaft (3) and a rotor (10) rotatable arranged around the shaft (3) and connected to at least one of the eccentric masses (4,5,6). The rotor (10) is arranged to be actuated by at least one magnetic field to rotation around the shaft (3) and the winding unit (9) is arranged to generate the magnetic fields which actuates the rotor (10) to rotation.

9 Claims, 2 Drawing Sheets

(56) References Cited

U.S. PATENT DOCUMENTS

| | | | | |
|---|---|---|---|---|
| 5,005,439 A | * | 4/1991 | Jensen | F16F 15/22 |
| | | | | 248/550 |
| 5,984,572 A | | 11/1999 | Mitsui | |
| 10,024,003 B2 | * | 7/2018 | Villwock | E01C 19/282 |
| 2006/0266153 A1 | * | 11/2006 | Clary | B06B 1/166 |
| | | | | 74/570.21 |
| 2014/0161529 A1 | | 6/2014 | Darscheid et al. | |
| 2014/0326088 A1 | | 11/2014 | Burton et al. | |
| 2015/0167259 A1 | | 6/2015 | Steffen | |
| 2017/0102284 A1 | | 4/2017 | Völkel | |

* cited by examiner

VIBRATORY DEVICE FOR COMPACTING MACHINE

CROSS REFERENCE TO RELATED APPLICATIONS

This application is the National Stage Entry under 35 U.S.C. § 371 of Patent Cooperation Treaty Application No. PCT/IB2016/000153, filed 19 Feb. 2016, which claims the benefit of Sweden Application No. 1500069-8, filed 6 Feb. 2015, the disclosures of which are incorporated herein by references in their entireties.

This invention concerns the design of vibratory devices for compacting machines as road rollers and vibratory plates for example. The vibratory devices incorporates eccentric masses which are rotated around a non-rotating shaft in order to generate vibrations. The eccentric masses are rotated by motors which are integrated with the eccentric masses. The motors are supplied with power through power distributing systems which are integrated in the non-rotating shafts. The invention is especially suitable for electrical driven vibratory devices with adjustable amplitude or adjustable direction of vibrations. The invention makes fast and high precocious adjustments possible and are by that reason especially suitable for use in systems whose compacting performance are adjusted automatically depending on the ground conditions.

The United States Patent Publication no. US2014/0161529 shows a vibratory device with a hydraulic motor integrated with the eccentric mass of the device and in the same time constituting a part of the mass. The motor is arranged around a non-rotating shaft and is driven by a hydraulic liquid, distributed through canals inside the shaft. An advantage with the arrangement is that a swiveling connection isn't required at the end of the shaft that is connected to the hydraulic system of the compacting machine. The device can be provided with a number of similar arrangements in order to accomplish an adjustable vibratory device, according to the application. A problem with such an adjustable vibratory device is that the hydraulic drive doesn't provide the rapidity and precision that is required in these connections.

The purpose with present invention is to obtain a vibratory device which comprise the advantages and in the same time solves the problems with the earlier mentioned and known device. Furthermore, an overall purpose is to accomplish an electrical driven vibratory device. The present invention serves its purpose by providing electrical drive with the fast and precisions adjustments that are associated with such drive. An additional advantage is that in the main same vibratory device can generate both circular vibrations, with or without adjustable amplitude, and directed vibrations, with adjustable direction. This have earlier required different and mechanically complex devices but is in present invention just a question about the logics in programmable electronic systems.

BRIEF DESCRIPTION OF THE DRAWINGS

In order to further explain the characteristics of the invention, hereafter, by way of example without any limiting character, some preferred embodiments are described of a vibratory device according to the invention for a compacting machine, reference being made to the accompanying FIGS. 1-6, wherein.

DETAILED DESCRIPTION

Figure 1:
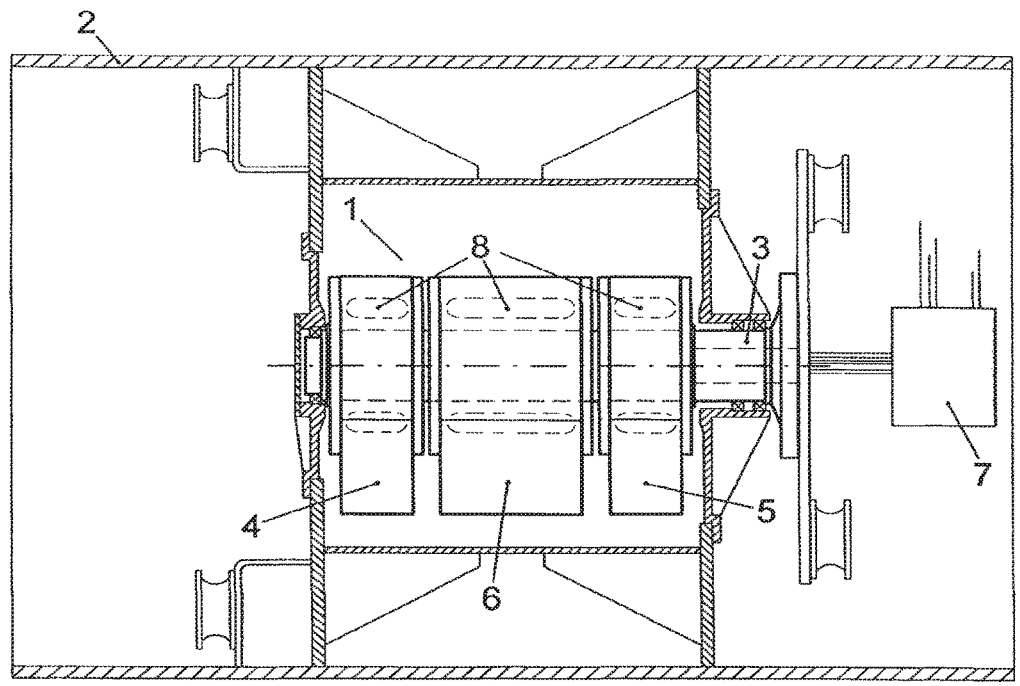
FIG. 1 shows a longitudinal section of a roller drum with a vibratory device according to the present invention.

FIG. 1 shows a vibratory device 1 arranged in a roller drum 2 of a self-propelled roller (not shown). The roller is arranged for diesel-electric drive but it's also possible to use the vibratory device 1 at pure electrical drive or at electrical drive combined with other fossil or non-fossil fuels. The vibratory device 1 comprise a shaft 3, a first 4, a second 5 and a third 6 eccentric mass and a control unit 7 (schematic shown in the drawing). Furthermore, the vibratory device 1 comprise one motor 8 per eccentric mass 4,5,6 for rotating drive of the masses 4,5,6 around the shaft 3. The roller drum 2 is rotatable arranged around the vibratory device 1 by the shaft 3 being connected via bearings to the drum 2. The purpose with the rotatable connection is to make rotating drive of the drum 2 possible with the drum motor of the roller (not shown) in order to run the roller forward or backward. One end of the shaft 3, the right one in the drawing, is non-rotatable but flexible connected to the frame of the roller (not shown), via rubber mounts. The purpose with the flexible mount is to make it possible for the vibratory device 1 to follow the vibration movement that it in an expected way actuates the drum 2 to perform. It's quite possible to only provide the vibratory device 1 with one eccentric mass which is arranged in the same way as the third eccentric mass 6 in the drawing. In such an embodiment of the invention is it merely possible to actuate the vibratory device 1 to generate a circular vibration movement with a non-adjustable amplitude. It's also quite possible to arrange the vibratory device 1 in the bottom plate of a vibratory plate instead. The shaft 3 shall be non-rotatable connected to the bottom plate in such an embodiment. The control unit 7 is arranged to receive electrical power from the generator and/or accumulator of the roller and arranged to distribute the power to the motors 8. The control unit 7 is also arranged to receive control operations from the operator of the roller and arranged to process signals from sensors and electronic systems in the roller. Especially signals which are related to the rollers compacting performance. The control unit 7 comprise a programmable electronic system, arranged to control the drive of the motors 8 according to a preset logic of the system. The control unit 7 is arranged to control the drive of the motors 8 by actuating at least one parameter of the electrical power which is distributed to the motors 8.

Figure 2:
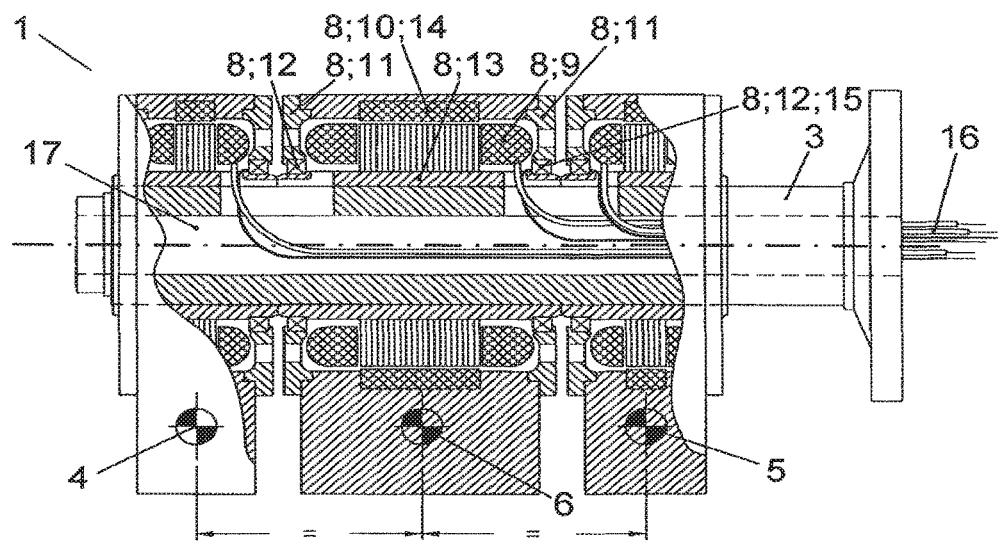
FIG. 2 shows an enlarged and partly sectioned view of the vibratory device from FIG. 1.

FIG. 2 shows the eccentric masses 4,5,6 of the vibratory device 1 and the in the masses 4,5,6 integrated motors 8. Two of the eccentric masses, the first 4 and second 5 eccentric mass, are arranged with equal masses and so that imagined planes, coinciding with the center of gravity of respective mass 4,5 and perpendicular against the length extension direction of the shaft 3, are located at same distance from the center of gravity of the third eccentric mass 6. The two eccentric masses 4,5 with equal masses are in other words symmetrical arranged on each side of the third eccentric mass 6. The third eccentric mass 6 is arranged with the same mass as the mass of the two other eccentric masses 4,5 together. The arrangement makes it possible to adjust the vibration amplitude during generation of circular vibrations to eligible values between a maximum value and zero.

Each motor 8 comprise a winding unit 9 and a rotor 10. The motors 8 are in principal similar arranged and their performance are adapted to the eccentric mass they are driving. References in the drawing are by that reason only made to the motor 8 for the third eccentric mass 6. The motor 8 is said to be integrated with the eccentric mass 6 because the rotor 10 of the motor 8 being integrated with and connected to the mass 6. The rotor 10 is rotatable arranged around the shaft 3 by being rotatable connected to the shaft 3 via side covers 11, bearings 12 and an inner tube 13. The inner tube 13 makes it possible to pre-assemble the motor 8 and to push it on the shaft 3 during the preparing of the vibratory device 1. The inner tube 13 and the shaft 3 are rotary locked to each other by a keyway connection. The winding unit 9 is connected to the shaft 3 via the inner tube 13. The winding unit 9 is arranged to generate at least one magnetic field with the purpose to actuate the rotor 10 to rotate around the shaft 3. The rotor 10 comprise at least one permanent magnet 14 and is thereby arranged so that it can be actuated to rotation by the magnetic field. The permanent magnets 14 can be replaced by squirrel cage windings or rotor windings if the winding unit 9 is arranged to generate rotating magnetic fields. The vibratory device 1 also comprise three rotation position sensors 15 connected to the control unit 7 (see FIG. 1). Each of the rotation position sensors is arranged to detect the instantaneous rotation angle position in relation to the shaft 3 for the center of gravity of one eccentric mass 4,5,6. The rotation position sensors 15 comprise so called Hall effect sensors which are integrated with the bearings 12. However, it's not necessary to integrate the rotation position sensors 15 with the bearings 12. The sensors 15 can also be integrated with the motors 8 or arranged as individual components. The rotation position sensors 15 are connected to the control unit via a cabling 16. The cabling is arranged for conducting electrical signals. The cabling 16 is also arranged for distributing of electrical power from the control unit 7 to the motors 8. The shaft 3 comprise a channel 17 which is arranged for making routing of the cabling 16 possible between the motors 8/rotation position sensors 15 and the end of the shaft 3.

Figure 3:
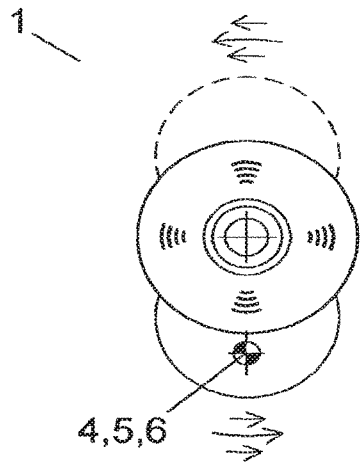
FIGS. 3 and 4 show side views of the device from FIG. 1 during a drive mode that generates circular vibrations.

FIG. 3 shows the vibratory device 1 during a first type of drive mode in which the amplitude of the generated circular vibrations is maximal (illustrated with cone-shaped curves). A commando from the operator of the roller, or a signal from a system of the roller which automatically controls its compacting power, have actuated the programmable electronic system of the control unit 7 (shown in FIG. 1) to execute a section in the logics which corresponds with the drive mode. The control unit is in this type of drive mode arranged to drive the motor 8 (shown in FIG. 2) of the third eccentric mass 6 in a controllable speed in a first rotation direction, illustrated in the drawing with the longer of the bent arrows. The unit 7 is in the same time arranged to drive the motors 8 of the both other eccentric masses 4,5 in the same rotation direction (illustrated with short arrows in the drawing) as the first rotation direction. The drive of the two other motors 8 of the eccentric masses 4,5 is performed with a controllable difference in rotation angle position for the center of gravity of both eccentric masses 4,5 compared to the rotation angle position for the center of gravity of the third eccentric mass 6. The difference in rotation angle position is zero during the above described drive.

Figure 4:
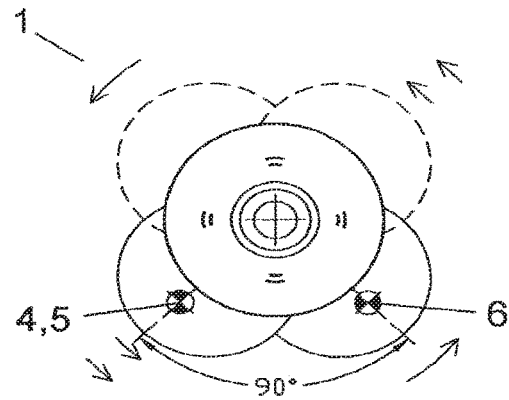

FIG. 4 shows same type of drive mode as FIG. 3 but the vibratory device 1 is now adjusted to 90 degrees difference in rotations angle position. The control unit 7 (shown in FIG. 1) has consequently actuated the vibratory device 1 to an adjustment that results in that both first 4 and second 5 eccentric mass follows the rotation of the third eccentric mass 6 with a 90-degrees difference in rotation angle position. During this drive will the vibration device 1 generate circular vibrations with about 71% of the amplitude that the drive in FIG. 3 result in. The vibratory device 1 can thus be adjusted to deliver vibration amplitudes between 0 and maximum amplitude by regulating of the difference in rotation angle position between 0 and 180 degrees.

Figure 5:
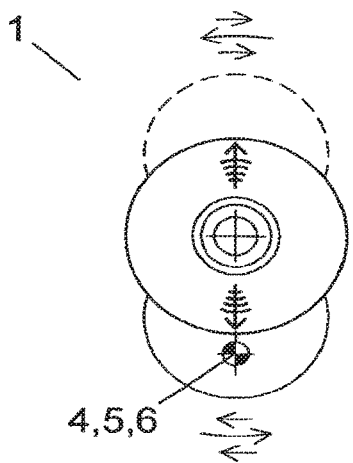
FIGS. 5 and 6 show side views of the device from FIG. 1 during a drive mode that generates directed vibrations.

FIG. 5 shows the vibratory device 1 during a second type of drive mode in which the direction of the generated vibrations is vertical (illustrated with cone-shaped curves/vertical arrow in the drawing). The control unit 7 (shown in FIG. 1) is arranged to drive the motor 8 of the third eccentric mass 6 in a first rotation direction which is illustrated by the longer of the bent arrows in the drawing. The center of gravity of the eccentric mass 6 obtains a controllable rotation angle position after every revolution under a controllable lap time during the drive. The motors 8 of the two other eccentric masses 4,5 are in the same time driven in an opposite rotation direction compared to the first rotation direction. The driving is effected at approximately the same rotation speed as for the motor 8 of the third eccentric mass 6. The driving is effected so that the center of gravity of the both eccentric masses 4,5 obtains the same rotation angle position as the center of gravity of the third eccentric mass 6, after every revolution. The controllable rotation angle position for the center of gravity of the eccentric mass 6 is at the above described drive put to a value which corresponds with vertical directed vibrations.

Figure 6:
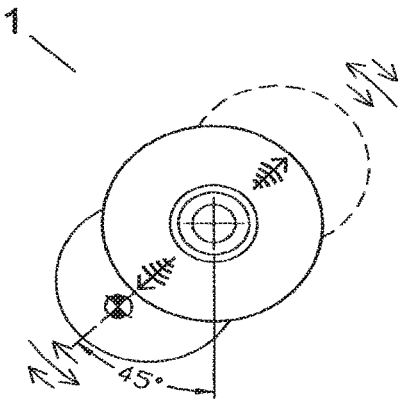

FIG. 6 shows same type of drive as FIG. 5 but the rotation angle position is here put to a value that corresponds to an inclination of the vibration direction of 45 degrees from the vertical plane. By varying the value of the rotation angle position can thus the vibratory device 1 be adjusted to deliver either pure vertical and horizontal directed vibrations or combination of both. The drive type is therefore especially suitable for use at forward and backwards going vibratory plates.

The term "eccentric mass" concerns an unbalanced mass which generates an eccentric moment when it's rotated around the shaft 3. The eccentric moment is the product of the unbalanced mass and the length of the radius between the rotation center of the mass and its center of gravity. If one or several eccentric weights are connected to one rotor 10, is their unbalanced mass added together considered as "the eccentric mass" and the center of gravity of the total unbalanced mass as "the center of gravity of the eccentric mass".

The invention is in no way limited to the forms of embodiments described above or shown in the drawings, however, a vibratory device according to the invention for a compacting machine can be made in all shapes and sizes without departure from the scope of the invention.

The invention claimed is:

1. A vibratory device for a compacting machine, the vibratory device comprising a non-rotatable shaft, at least one eccentric mass rotatably arranged around the shaft and at least one motor arranged around the shaft, the at least one motor further arranged for rotating drive of the at least one eccentric mass around the shaft, wherein the at least one motor comprises a winding unit connected to the shaft and a rotor rotatably arranged around the shaft and connected to the at least one eccentric mass, wherein the rotor is arranged to be actuated by at least one magnetic field to rotate around the shaft, and wherein the winding unit is arranged to generate the at least one magnetic field.

2. The vibratory device in accordance with claim 1, wherein the shaft comprises at least one channel arranged for a cabling.

3. The vibratory device in accordance with claim 1, wherein the vibratory device further comprises a control unit arranged to control the drive of the at least one motor, and at least one rotation position sensor connected to the control unit, the at least one rotation position sensor arranged to detect the instantaneous rotation angle position, in relation to the shaft, for the center of gravity of the at least one eccentric mass.

4. The vibratory device in accordance with claim 1, wherein the rotor comprises at least one permanent magnet.

5. The vibratory device in accordance with claim 1, wherein the rotor comprises at least one squirrel cage winding or at least one rotor winding.

6. The vibratory device in accordance with claim 1, wherein the vibratory device comprises three eccentric masses each driven by a respective motor and three rotation position sensors each arranged to detect the instantaneous rotation angle position, in relation to the shaft, for one of the three eccentric masses, wherein two of the eccentric masses are arranged with equal masses, and wherein imagined planes that are coinciding with the centers of gravity of the respective two of the eccentric masses and perpendicular against the length extension direction of the shaft are located at same distance from the center of gravity of the third eccentric mass.

7. The vibratory device in accordance with claim 6, wherein the third eccentric mass is arranged with the same mass as the mass of the two other eccentric masses together.

8. The vibratory device in accordance with claim 7, wherein a control unit is arranged to drive the corresponding motor of the third eccentric mass with a controllable rotation speed in a controllable first rotation direction, and wherein the control unit is arranged to drive the corresponding motors of the two other eccentric masses in the same rotation direction as the first rotation direction with a controllable difference in the instantaneous rotation angle position for the centers of gravity of the two other eccentric masses compared to the instantaneous rotation angle position for the center of gravity of the third eccentric mass.

9. The vibratory device in accordance with claim 7, wherein a control unit is arranged to drive the motor of the third eccentric mass in a first rotation direction in a way so that the center of gravity of the third mass obtains an controllable rotation angle position after every revolution under a controllable lap time, and wherein the control unit is further arranged to drive the motors of the two other eccentric masses in an opposite rotation direction compared to the first rotation direction in a way so that the centers of gravity of the two other eccentric masses obtain the same rotation angle position as the center of gravity of the third eccentric mass after every revolution.

* * * * *